S. E. SPENCER.
STARTING DEVICE FOR AUTOMOBILE ENGINES.
APPLICATION FILED MAR. 1, 1907.

906,078.

Patented Dec. 8, 1908.

Witnesses.
L. M. Sangster
George A. Neubauer.

Inventor.
Samuel Enis Spencer.
By G. F. Sangster
Attorney.

UNITED STATES PATENT OFFICE.

SAMUEL ENIS SPENCER, OF SPRINGVILLE, NEW YORK.

STARTING DEVICE FOR AUTOMOBILE-ENGINES.

No. 906,078.　　　　Specification of Letters Patent.　　　Patented Dec. 8, 1908.

Application filed March 1, 1907. Serial No. 360,071.

*To all whom it may concern:*

Be it known that I, SAMUEL ENIS SPENCER, a citizen of the United States, residing at Springville, in the county of Erie and State of New York, have invented a certain new and useful Improvement in Starting Devices for Automobile-Engines, of which the following is a specification.

This invention relates to an improved starting device for automobiles which is permanently attached to the car and is provided with a shaft which may be connected to the engine of the automobile to start the same or may be utilized for the purpose of transmitting power to any desired attachment such as an air pump when the engine is running.

The main object of the invention aside from the starting of the engine is to provide for sufficiently disconnecting the crank handle from the shaft of the starting device to permit it to remain stationary when the shaft is employed as an intermediate connection between the engine shaft and the device to which power is transmitted.

The invention also relates to certain novel details of construction of the starting device, all of which will be fully and clearly hereinafter described and claimed reference being had to the accompanying drawings, in which,—

Figure 1:
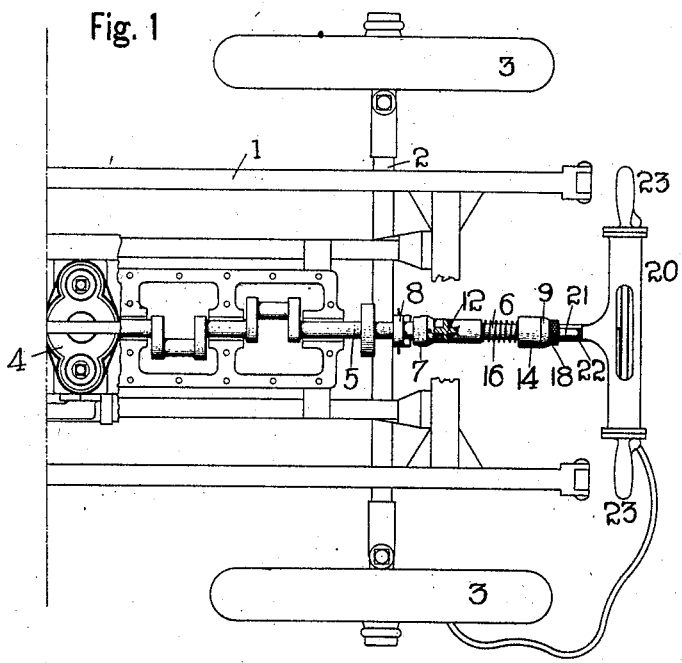
Figure 5:
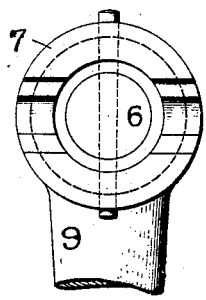
Figure 2:
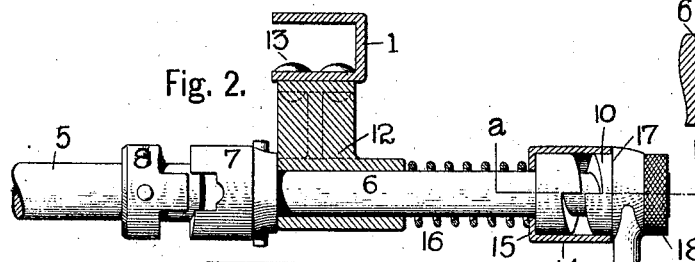
Figure 6:
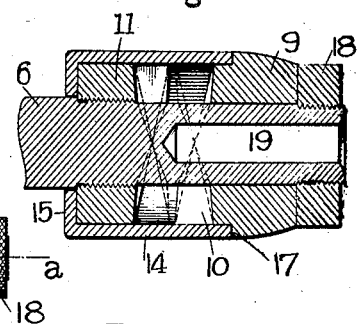
Figure 3:
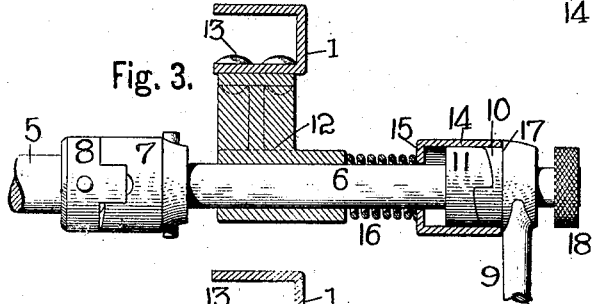
Figure 7:
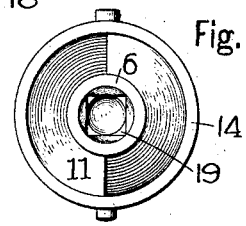
Figure 4:
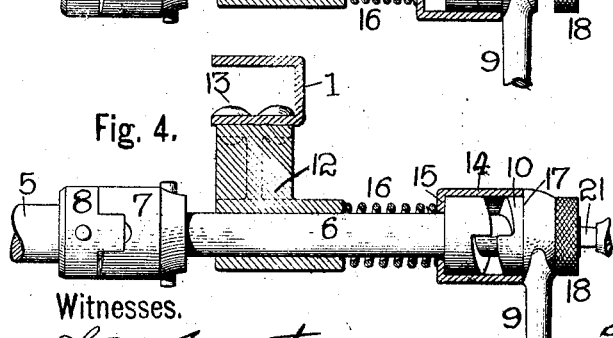
Figure 8:
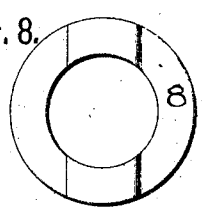

Figure 1 is a plan view of the front end of an automobile of conventional type equipped with the improved starting device, the bonnet being removed and a portion of the automobile frame and mechanism broken away to more fully disclose the improved device. Fig. 2 is an enlarged side elevation of the improved starter, together with a fragment of the shaft of the engine and a section through the supporting bracket and the sleeve; the shaft of the starter being shown disconnected from the engine, and the crank disconnected from the shaft of the starting device. Fig. 3 is a view similar to Fig. 2 with the shaft of the starter connected to the engine shaft and the crank connected to the shaft of the starter and in position to be turned to start the engine. Fig. 4 is a view similar to Figs. 2 and 3, with the shaft of the starter connected to the engine and in position to transmit power, and the crank disconnected from the starter shaft to remain stationary, also showing a fragment of a device to which power is to be transmitted. Fig. 5 is an enlarged inner end view of the improved starting device detached from the automobile frame. Fig. 6 is an enlarged fragmentary longitudinal section through the improved starting device on line *a a*, Fig. 2. Fig. 7 is an enlarged outer end view of the improved starting device detached from the automobile frame, the crank being omitted. Fig. 8 is an enlarged detached face view of the clutch member on the engine shaft.

A fragment of an automobile of conventional type is illustrated in Fig. 1, with the improved starting device attached thereto, and includes a frame 1, front axle 2, wheels 3 and engine 4 having some of its cylinders removed to expose the engine crank shaft 5.

The improved starter comprises a shaft 6, having a clutch member 7 mounted at its inner end which is adapted to engage with a clutch member 8, at the forward extremity of the engine shaft 5, and a crank 9, which is slidably and rotatably fitted on the forward end of the shaft 6, and has a ratchet or one way clutch member 10, adapted to engage with a ratchet or one way clutch ring 11, mounted on the shaft 6, near its forward end see Figs. 2, 3 and 4. The shaft 6 is slidably and rotatably supported by a bracket 12 depending from the frame 1, to which it is attached by rivets 13. An inclosing sleeve 14 is fitted loosely around the ratchet clutch members 10 and 11, and has an inwardly extending annular flange 15, at its rear end which fits loosely around the starter shaft. A spiral spring 16 is fitted loosely around the shaft of the starter with its ends bearing respectively against the flange 15, and the forward end of the bracket 12. This spring serves to force the sleeve 14, forward and the sleeve in turn bears at its forward end against the shoulder 17 on the crank 9, pressing the crank together with the starter shaft forward sufficiently to disconnect the crank from the starter shaft and the starter shaft from the engine shaft. It will thus be seen that the spring 16 serves the double function of normally maintaining the crank and the starter shaft in an inoperative disconnected position both with respect to each other. The crank is held against displacement from the starter shaft 6 by a nut 18, screwed upon the outer end of the starter shaft, see Fig. 6. The outer extremity of the starter shaft 6, has a deep longitudinal recess or socket 19, formed therein, into which an instrument may be inserted to which it is desired to transmit motion. This recess or socket 19 is preferably made square in cross section as shown in Figs. 6 and 7. By means of this improved starting device, motion can be transmitted to any instrument such as, for instance, a pump 20, for inflating the tires of the automobile as shown in Fig. 1. The pump 20, has a shaft provided with a square projecting portion 21, of approximately the same size as the recess or socket 19, and which is inserted into said recess or socket when it is desired to operate the pump, see Figs. 1 and 4.

The operation of this improved starting device is as follows,—Normally, the starting device is in the position shown in Fig. 2, with the clutch members 7 and 8, and 10 and 11, disconnected. When it is desired to start the engine of the automobile the operator pushes the crank 9, inwardly against the tension of the spring 16, thereby bringing the clutch member 10, into engagement with the clutch member 11. When these clutch members are in engagement, the starter shaft 9 is carried back against the tension of the spring until the clutch members 7 and 8 are in engagement. The device is now in the position shown in Fig. 2, and to start the engine, the operator grasps the handle 22, on the crank 9 and gives a sharp turn to the crank, thereby rotating the starter shaft 6, and through the clutch at the inner end, the engine shaft 5, and starting the engine in the usual manner. By referring to Fig. 3, it will be seen that owing to the form of the clutching faces of the clutch members 10 and 11, they will be instantly disengaged when the engine is started, the impulse of the engine shaft tending to force them apart. This separating movement is assisted by the spiral spring 16, which also withdraws the starter shaft 6, and disengages the clutch members 7 and 8. When the engine is operating and it is desired to attach an instrument, as in the present instance the pump 20, shown in Fig. 1 for inflating the tires, the operator grasps the pump by the handles 23, inserts the end of the square shaft 21 into the recess 19 in the starter shaft and pushes inwardly against the tension of the spring 16, until the clutch member 7 on the inner end of the starter shaft engages with the clutch member 8 on the engine shaft 5. This rotates the starter shaft 9 and the shaft 21 of the pump, thereby operating the pump. By referring to Fig. 4, it will be seen that during this operation the sleeve 14, acting in conjunction with the spring 16, maintains the clutch member 10 on the crank 9, out of engagement with the clutch member 11 on the starter shaft, so that the crank remains in its normally inoperative position. When it is desired to stop the pump, the operator withdraws the square shaft 21 from the socket 19, which permits the spring 16 to disengage the clutch members 7 and 8.

I claim as my invention:—

1. The combination with an automobile body and an engine, of a starting device for the engine of said automobile permanently attached to the automobile body and having a shaft normally disconnected from the engine shaft and a crank normally disconnected from the starting shaft; means whereby the crank and shaft of the starting device are adapted to be manually connected to each other and to the engine shaft in position to start the engine and means whereby the shaft of the starting device is adapted to be independently connected to the engine shaft in position to transmit power while the crank remains stationary.

2. The combination with an automobile body and an engine, of a starting device for the engine of said automobile permanently attached to the automobile body and having a starting shaft normally disconnected from the engine shaft and a starting crank slidably mounted on the starting shaft, means adapted to maintain the starting crank normally disconnected from the starting shaft; means whereby the crank and shaft of the starting device are adapted to be manually connected to each other and to the engine shaft in position to start the engine, and means whereby the shaft of the starting device is adapted to be independently connected to the engine shaft in position to transmit power while the crank remains stationary.

3. The combination with an automobile body and an engine having a shaft, of a starting device for said engine permanently attached to the automobile and having a starting shaft normally disconnected from the engine shaft and a starting crank slidably mounted on the starting shaft, means adapted to maintain the starting crank normally disconnected from the starting shaft, a clutch member on the starting crank, a clutch member on the starting shaft adapted to be engaged with the clutch member of the crank when said crank is in one position and means whereby the starting shaft is operatively connected to the engine shaft.

4. The combination with an engine and its shaft, of a starting device for said engine, comprising a starting shaft; means whereby the starting shaft is adapted to be engaged with the engine shaft to start the engine and also to serve to transmit power, a starting crank slidably mounted on the starting shaft, a clutch member carried by the starting crank, a clutch member on the starting shaft adapted to be engaged with the clutch member of the starting crank to connect the crank to the starting shaft, an inclosing sleeve loosely fitting around the clutch members and a spring for maintaining the starting shaft normally disconnected from the engine shaft and the starting for normally maintaining the crank in disengaged shaft, substantially as set forth.

5. The combination with an engine and its shaft, of a starting device therefor having a shaft, means whereby said starting shaft is adapted to be connected to the shaft of the engine to start said engine and also to serve as a power transmitting device and a starting crank slidably mounted on the starting shaft and having a clutch member and a clutch member on the starting shaft adapted to be engaged with the clutch member of the crank when said crank is in one position and disengaged therefrom when said crank is in another position and a spring for normally maintaining the crank in disengaged position.

6. The combination with an engine and its shaft, of a starting device therefor having a shaft, means whereby said starting shaft is adapted to be connected to the shaft of the engine to start said engine and also to serve as a power transmitting device, a starting crank slidably mounted on the starting shaft and having a clutch member and a clutch member on the starting shaft adapted to be engaged with the clutch member of the crank when said crank is in one position and disengaged therefrom when said crank is in another position and spring means for normally maintaining both the starting shaft and starting crank in disengaged position, substantially as set forth.

7. The combination with an engine and its shaft, of a starter therefor having a shaft adapted to be connected with the engine shaft to start said engine, means whereby said starting shaft may also serve as a power transmitting element to operate a suitable device such as an air pump, and a crank slidably mounted on the starter shaft and adapted to be connected to the said shaft to turn the same to start the engine and disconnected therefrom to remain stationary when the starter shaft is transmitting power, substantially as set forth.

SAMUEL ENIS SPENCER.

Witnesses:
L. M. SANGSTER,
GEORGE A. NEUBAUER.